(12) United States Patent
Dunn

(10) Patent No.: US 11,264,858 B2
(45) Date of Patent: Mar. 1, 2022

(54) HAIRPIN ELECTRIC MACHINE WITH SELF-SUPPORTING JUMPERS

(71) Applicant: Ford Global Technologies, LLC, Dearborn, MI (US)

(72) Inventor: Casey Taylor Dunn, Brownstown Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 16/296,399

(22) Filed: Mar. 8, 2019

(65) Prior Publication Data
US 2020/0287434 A1    Sep. 10, 2020

(51) Int. Cl.
| | | |
|---|---|---|
| H02K 3/50 | (2006.01) | |
| H02K 3/28 | (2006.01) | |
| H02K 15/06 | (2006.01) | |
| H02K 1/16 | (2006.01) | |
| H02K 5/22 | (2006.01) | |

(52) U.S. Cl.
CPC ............... *H02K 3/50* (2013.01); *H02K 1/16* (2013.01); *H02K 3/28* (2013.01); *H02K 5/225* (2013.01); *H02K 15/064* (2013.01)

(58) Field of Classification Search
CPC .......... H02K 3/50; H02K 3/28; H02K 15/064; H02K 1/16; H02K 5/225; H02K 15/0414; H02K 15/0421; H02K 15/0025; H02K 15/0087; H02K 15/0428; H02K 3/52; H02K 3/12; H02K 3/04; H02K 3/48; H02K 3/00; H02K 3/32; H02K 3/46; H02K 3/505; H02K 3/521; H02K 3/38; H02K 15/0068; H02K 2203/09
USPC ....... 310/140, 141, 142, 144, 146, 149, 150, 310/201, 202, 204, 205, 206, 207, 189, 310/198, 71
See application file for complete search history.

(56) References Cited

U.S. PATENT DOCUMENTS

| | | | |
|---|---|---|---|
| 7,855,481 B2 | 12/2010 | Chang et al. | |
| 2016/0181881 A1* | 6/2016 | Magri | H02K 3/12 310/71 |
| 2016/0218603 A1* | 7/2016 | Schroth | B23K 9/23 |
| 2016/0308413 A1* | 10/2016 | Ciampolini | H02K 3/50 |
| 2017/0288318 A1 | 10/2017 | Neet et al. | |
| 2018/0097416 A1* | 4/2018 | Dang | H02K 3/505 |
| 2018/0097417 A1* | 4/2018 | Dang | H02K 3/505 |

* cited by examiner

*Primary Examiner* — Quyen P Leung
*Assistant Examiner* — Alexander A Singh
(74) *Attorney, Agent, or Firm* — David B Kelley; Brooks Kushman P.C.

(57) ABSTRACT

An electric machine includes a stator core and interconnected hairpins attached to the stator core and defining a path. A pair of the interconnected hairpins have first and second ends, respectively, and are circumferentially spaced apart from each other. A jumper is interconnected between the first and second ends. The jumper has a body defining first and second holes that receive the first and second ends, respectively. The first hole is defined by a perimeter having opposing first and second walls and opposing third and fourth walls.

16 Claims, 3 Drawing Sheets ized or described. The combinations of features illustrated provide representative embodiments for typical applications. Various combinations and modifications of the features consistent with the teachings of this disclosure, however, could be desired for particular applications or implementations.

HAIRPIN ELECTRIC MACHINE WITH SELF-SUPPORTING JUMPERS

TECHNICAL FIELD

This application relates to electric machines having hairpin windings and more specifically to the design of jumpers used to interconnect hairpins.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core and interconnected hairpins attached to the stator core and defining a path. A pair of the interconnected hairpins have first and second ends, respectively, and are circumferentially spaced apart from each other. A jumper is interconnected between the first and second ends. The jumper has a body defining first and second holes that receive the first and second ends, respectively. The first hole is defined by a perimeter having opposing first and second walls and opposing third and fourth walls.

According to another embodiment, an electric machine includes interconnected hairpins defining a path. A pair of the hairpins have first and second ends, respectively. An extruded jumper is interconnected between the first and second ends. The jumper has a body defining first and second holes that receive the first and second ends, respectively. Each of the holes has at least four sides to self-support the jumper to the hairpins.

According to yet another embodiment, a method includes inserting first and second hairpins into slots of a stator core such that first and second ends of the first and second hairpins, respectively, are spaced apart from each other. Each of the hairpins has a conductor encased in insulation. The method further includes striping the insulation from the first and second ends, and installing an extruded jumper, that includes a body defining opposing upper and lower surfaces and first and second holes that each have a perimeter with opposing first and second walls and opposing third and fourth walls, to the stator core by receiving the first and second ends through the first and second holes, respectively, and seating the lower surface of the body on the insulation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
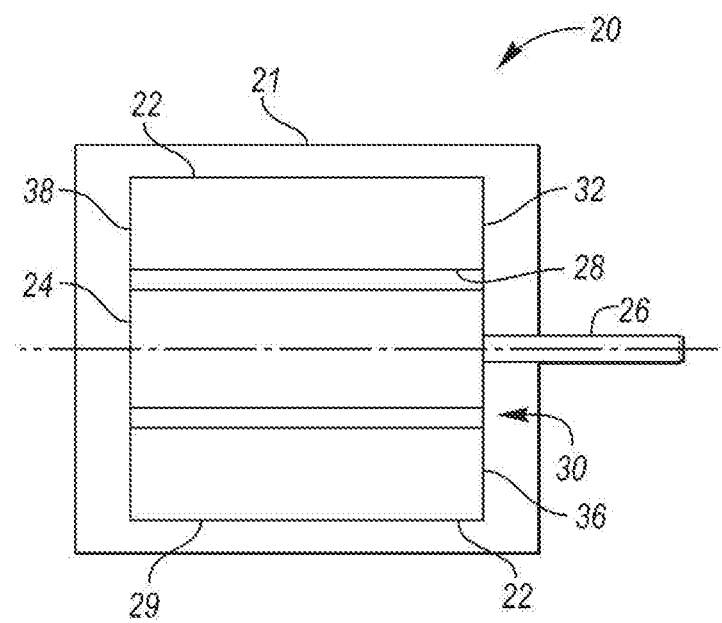
FIG. 1 is a schematic diagram of an electric machine.
Figure 2:
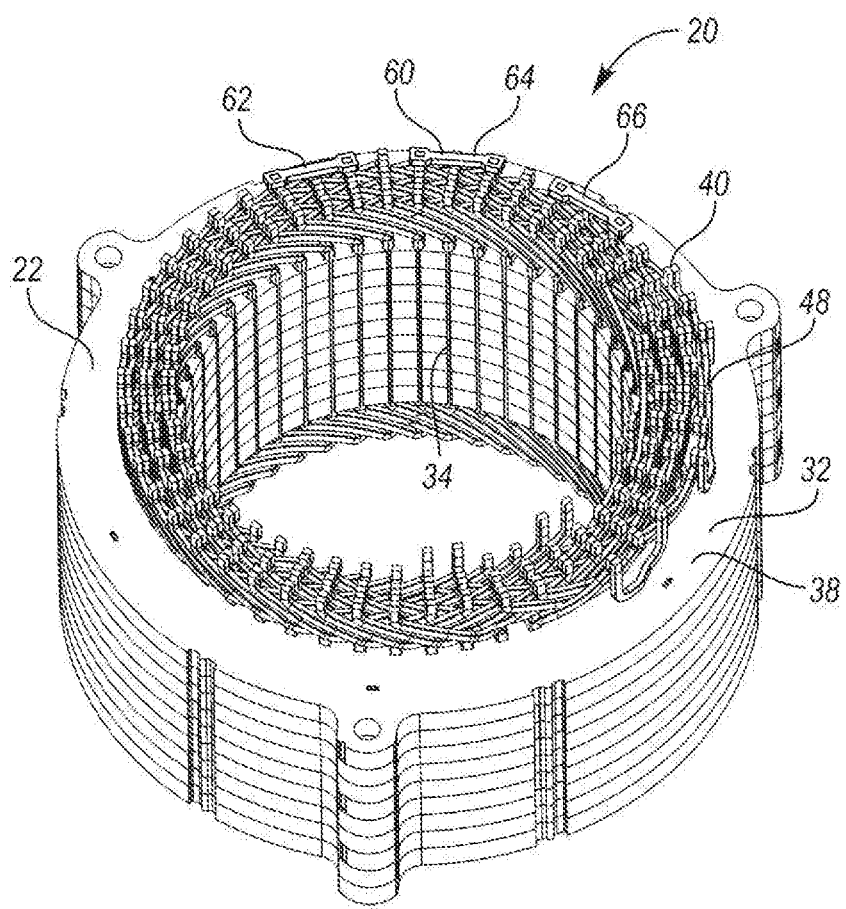
FIG. 2 is a perspective view of a stator of the electric machine.

Referring to FIGS. 1 and 2, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase AC voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery. While described in the context of an electrified vehicle, the electric machine 20 may also be used in nonautomotive applications. For example, the electric machine 20 may be used in manufacturing equipment or in power-generation machines.

The electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a driveshaft 26 that extends through the housing 21. The driveshaft 26 is configured to couple with a load, such as a drivetrain of the vehicle.

The stator core 32 defines stator slots 34 circumferentially arranged and extending outwardly from the inner diameter 28. The slots 34 may be equally spaced around the circumference and extend axially from a first end 36 of the core 32 to a second end 38. In the illustrated embodiment, the core 32 defines forty-eight slots and has eight poles, but the core 32 may include more or fewer slots and/or poles in other embodiments. For example, the core 32 may define seventy-two slots and have eight poles.

The electric machine 20 may include hairpin windings 40 placed in the slots 34 of the core 32. Hairpin windings are an emerging technology that improves efficiency for electric machines used in vehicles and other contexts. The hairpin windings 40 improve efficiency by providing a greater amount of stator conductors to reduce resistance of the winding 40 without encroaching into space reserved for the electrical steel and the magnetic flux path. The hairpin windings 40 may be wave windings in which the windings 40 weave pole to pole in a wave-like pattern.

The electric machine 20 may be a three-phase AC machine in which the hairpin windings 40 are arranged in a U phase, a V phase, and a W phase. Each phase includes associated conductors (also known as pins, hairpins, or bar conductors) arranged in one or more paths of windings. Each path may be an electrical circuit that extends from the terminal lead to the neutral bridge. The path is formed of interconnected hairpins, some of which, may be connected by one or more electrical bridges.

The hairpins may include electrically conductive bar (e.g., copper or aluminum) coated in insulation. The bar may have a generally rectangular cross section. (The term generally or substantially rectangular acknowledges the inclusion of filleted corners.) The hairpins are bent to be generally U-shaped and include a pair of legs joined by a crown. The hairpins are installed in the stator core 32 by inserting the legs through corresponding ones of the slots 34. All of the hairpins may be installed from the same end of the stator core 32, e.g., end 36, so that all of the crowns are located on one end of the stator, e.g., end 36, and the ends of the legs are located on the other end, e.g., end 38. Once installed, the legs of the hairpins are bent away from each other to form twists that connect with the twists of other hairpins. The ends of corresponding hairpins are joined by a connection such as a weld 48. The connections may be arranged in rows. End 36 may be referred to as the crown end and end 38 may be referred to as the weld end. Each path includes associated hairpins that are connected, e.g., welded, at ends of the twists to form a continuous conductive conduit between a terminal and a neutral connection. Some hairpins may be spaced too far apart to be directly joined and may require an electrical bridge 60, e.g., a jumper, to interconnect those hairpins and complete the path.

In the illustrated embodiment, each phase includes a single jumper. That is, the U phase has a jumper 62, the V phase has a jumper 64, and the W phase has a jumper 66. Of course, other winding arrangements may have more or less jumpers. Each jumper may connect between a pair of hairpins. The jumper may be joined to the ends of the hairpin by welding, e.g., laser welding.

Manufacturing hairpin electric machines, such as electric machine 20, is complex due to the large number of connections that must be made. These connections are typically made by laser welding operations. A typical manufacturing process may include two primary weld stations, a first weld station in which the hairpin welds are made and a second weld station in which special welds are made. The special welds include the jumpers, the terminal lugs, the terminal leads, and the like. At the second weld station, the jumpers, the terminal lugs, the terminal leads, and the like, must be fixtured to be held in place during the welding operation as these components are typically not self-supporting. Fixturing all these components can require intricate and expensive tools that may increase cost and cycle time of manufacturing. Due to the complex geometries of these components and the number of different components that require fixturing, there is a need to simplify the fixturing process to improve efficiencies and reduce cost.

A typical hairpin winding includes a jumper having open slots that each extends inwardly from an edge of the jumper forming a three-sided slot sized to receive a rectangular hairpin therein. The three-sided slot surrounds three sides of the hairpin but does not enclose the fourth side. Since the fourth side is not enclosed, typical jumpers cannot be self-supported to the hairpins as the hairpins slip through the open slots. Thus, the jumpers must be fixtured during the welding process.

While not ideal, the open-slot jumper design is commonly used do to limitations in stamping technology. The hairpins are typically formed of metal stampings, and it is difficult to stamp a small, fully or mostly enclosed opening into a stamped jumper due to the opening being small compared to the thickness of the jumper. As a general stamping design rule, a cross section of a pierce punch (part that forms openings) should be larger than material thickness. Violating this rule can result in punch damage. Stamping an open slot on the edge of the jumper is very feasible as the punch may include a large non-cutting area that provides sufficient punch strength. Another problem associated with stamping fully or mostly enclosed openings is shearing of the border walls of the opening. This can be overcome by increasing the thickness of the border walls, however, increasing the thickness enlarges the overall size of the jumper leading to clearance issues.

Providing a jumper that can self-support to the hairpins without fixturing and enlargement may reduce manufacturing costs and increase efficiency. Providing enclosed or mostly enclosed openings in the jumper (as opposed to open slots) allows the jumper to self-support by receiving the hairpins through the openings, which retains the jumper in place. This type of jumper may be manufactured by extrusion, which does not have the above-noted manufacturing limitations.

Figure 3:
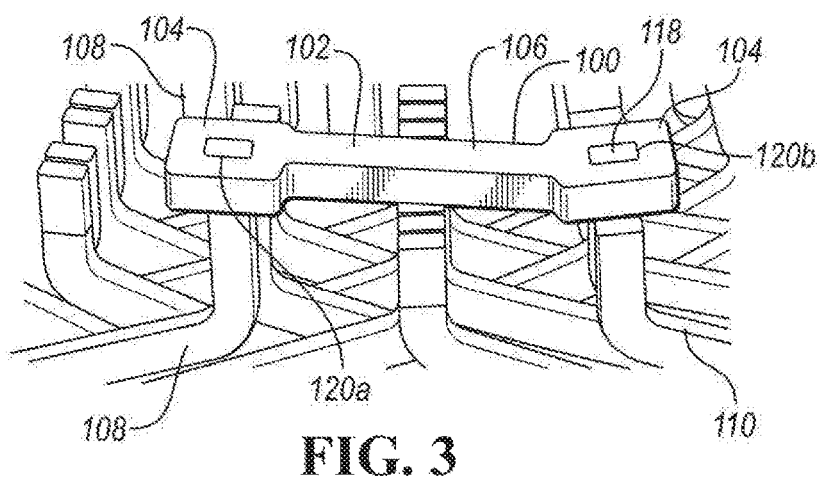
FIG. 3 is a perspective view of a jumper interconnecting a pair of hairpins.
Figure 4:
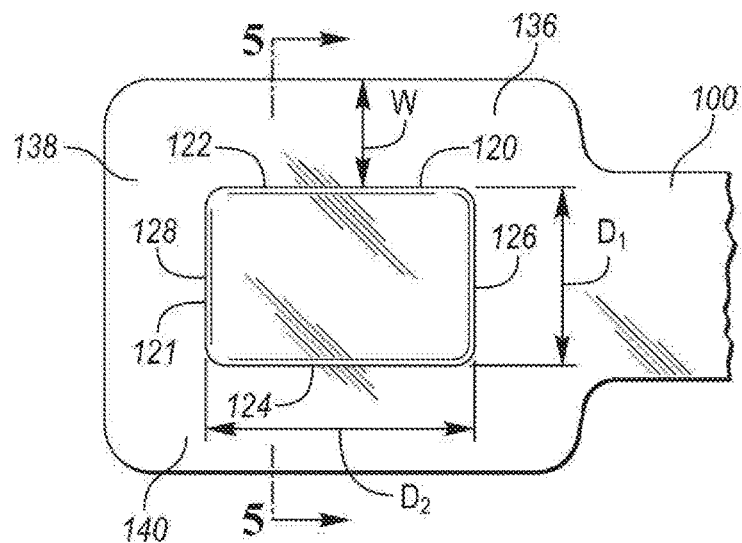
FIG. 4 is a partial top view of the jumper of FIG. 3.
Figure 5:
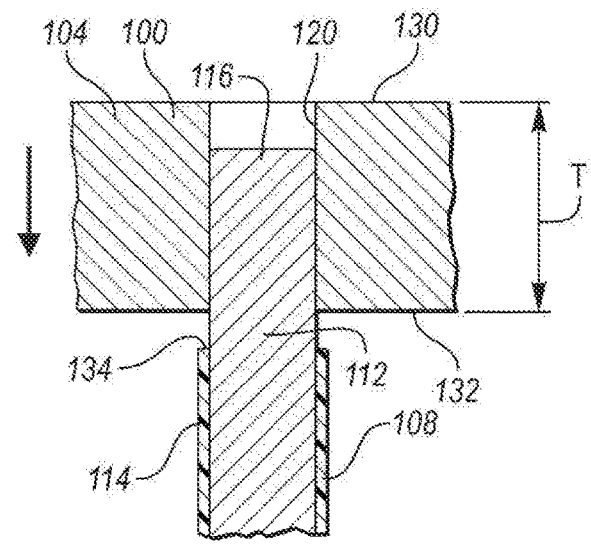
FIG. 5 is a partial cross-sectional view along cutline 5-5.

Referring to FIGS. 3, 4, and 5, an example jumper 100 that is self-supporting includes a body 102 formed of an electrically conductive material such as copper or aluminum. The body 102 may be an extrusion such as extruded cooper or aluminum. The body 102 may have a generally dog-bone shape with a pair of opposing joining portions 104 and an interconnecting portion 106 that is slender relative to the joining portions 104. The joining portions 104 are configured to connect to hairpins. The jumper 100 physically and electrically interconnects a first hairpin 108 to a second hairpin 110.

The first hairpin 108 includes a conductor 112, such as copper or aluminum, that is surrounded in insulation 114. The insulation 114 is stripped from the end 116 of the hairpin 108 to expose the conductor 112. The second hairpin 110 may be similarly constructed with the end 118 of the second hairpin 110 also being exposed conductor. The ends 116 and 118 are joined to the joining portions 104 by welding or other means.

Each of the joining portions 104 has a hole 120 defined by a perimeter 121. The may holes 120 may be referred to as having a diameter, which herein, refers to a largest distance between diametrically opposing points of the hole. The hole 120 is either fully enclosed (as illustrated) or mostly enclosed. The hole 120 may be generally rectangular to approximate the size and shape of the hairpin received therein. The hole 120 may have opposing first and second walls 122, 124 and opposing third and fourth walls 126, 128. The first and second walls 122, 124 are spaced apart by a first distance $D_1$, and the third and fourth walls 126, 128 are spaced apart by a second distance $D_2$ that is greater than the first distance $D_1$. The hole 120 extends from an upper surface 130 to a lower surface 132 so that the hole 120 extends completely through the thickness T of the jumper 100. In one or more embodiments, the distance $D_1$ is less than the thickness T. For example, $D_1$ may be 1.0 millimeter (mm) and T may be 2.5-3.0 mm. Thus, as explained above, stamping is an unlikely candidate for producing the jumper 100. Instead, extrusion may be used to manufacture the jumper 100.

The jumper 100 may be installed onto the electric machine 20 by inserting the end 116 of the first hairpin 108 into the hole 120a and inserting the end 118 of the second hairpin 110 into the hole 120b. The jumper 100 may be supported, without fixturing, with the lower surface 132 seated on an end surface 134 of the insulation 114. The perimeter 121 fully encircles the conductor 112 preventing excessive movement of the jumper 100 so that fixturing may not be required.

The extruded jumper 100 also allows the border walls 136, 138, and 140 to be thinner than a similarly structured stamped jumper. For example, the walls may have a width W of 1.5 to 3 mm. Stamping border walls of width W into a jumper having a thickness of T may lead to shearing. Extrusion poses no such risk.

Figure 6:
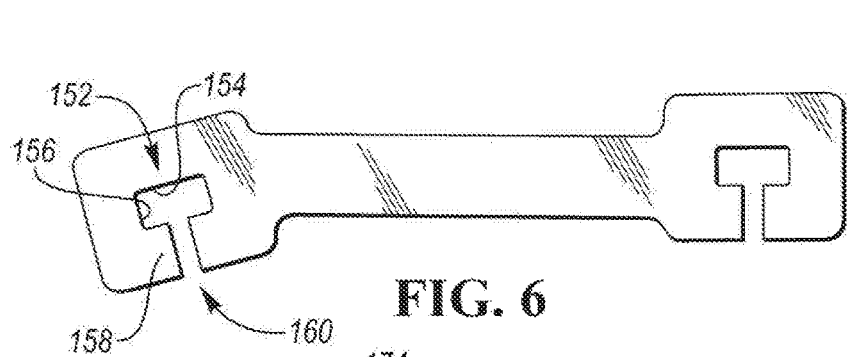
FIG. 6 is a top view of another jumper.

Referring to FIG. 6, another jumper 150 may include mostly enclosed holes 152 as opposed to the fully enclosed holes illustrated in jumper 100. The holes 152 include a perimeter 154 having five sidewalls 156 (fourth sidewall is cut in two creating five sidewalls). The holes 152 are generally rectangular with a slot 160 cut out of the border wall 158. The perimeter 154 is configured to surround all four sides of the hairpin received therein so that the jumper is self-supporting to reduce fixturing cost and time during the welding process. The slot 160 may be provided to reduce material costs and weight of the jumper 150.

Figure 7:
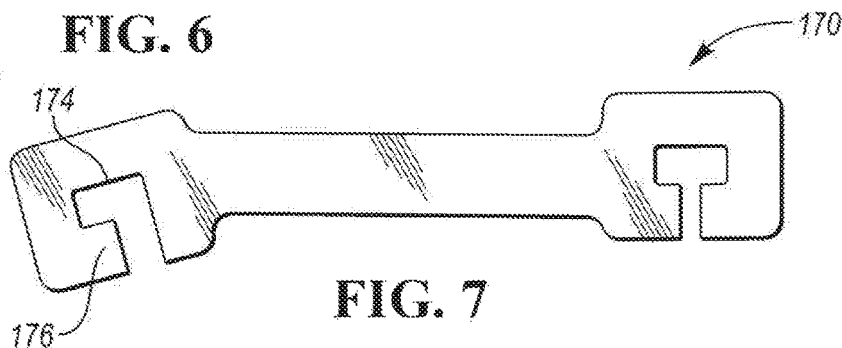
FIG. 7 is a top view of yet another jumper.

Referring to FIG. 7, yet another jumper 170 also includes mostly enclosed holes 172. The holes 172 have a perimeter 174 configured to surround all four sides of the hairpin received therein. The jumper 170 includes a stub wall 176 that engages with the fourth side of the hairpin so that the jumper 170 can be self-supported during welding.

While shown as rectangular, the hairpins and holes may have other cross-sectional shapes. For example, the hairpins and holes may be circular. While a circular hole has a continuous cylindrical sidewall, the cylindrical sidewall, for the purposes of this application and claims, has multiple opposing sides. The circular hole may be fully enclosed or may include an open slot.

The follow description and related figures describe an example method for manufacturing extruded jumpers and assembled hairpin electric machines using the extruded jumpers to reduce fixturing. These methods may be represented by flow charts or similar diagrams in one or more figures. These figures provide representative methods or processes that may be implemented to manufacture the above-described apparatuses. The various steps illustrated may be performed in the sequence illustrated, in parallel, in a different sequence, or in some cases omitted. Although not always explicitly illustrated, one of ordinary skill in the art will recognize that one or more of the illustrated steps may be repeatedly performed depending upon the particular process.

Figure 8:
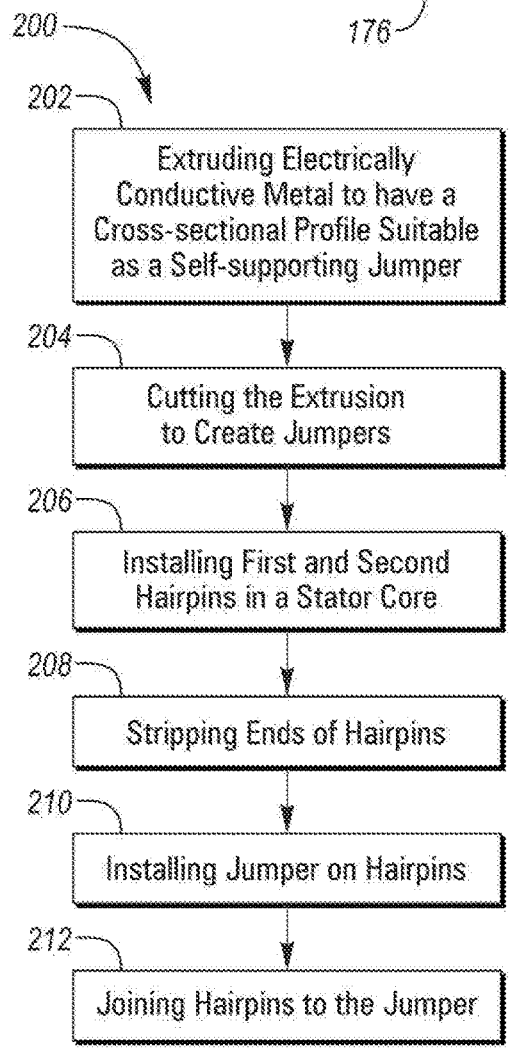
FIG. 8 is a flow chart illustrating a method of forming a jumper and assembling the jumper to an electric machine.
Figure 9:
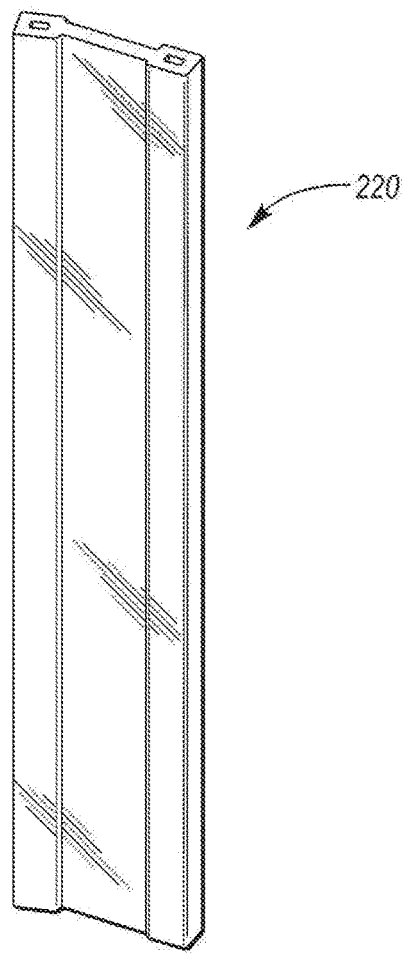
FIG. 9 is a perspective view of an extrusion of electrically conductive material having a cross-sectional profile suitable as a self-supporting jumper.

Referring to FIG. 8, a method 200 includes extruding electrically conductive material having a cross-sectional profile suitable as a self-supporting jumper at step 202. The cross-sectional profile may be any of the above-described cross-sectional profiles as shown in FIG. 3, 6, or 7. FIG. 9, for example, illustrates one such extrusion 220, which is a copper or aluminum extrusion having the cross-sectional profile of the embodiment illustrated in FIGS. 3 through 5. At step 204, the extrusion is cut at a desired thickness to create jumpers. For example, the jumpers may be cut so that they are 2.5 mm thick as described above. Of course, the jumpers may have other thicknesses in different embodiments depending upon design of the electric machine.

At step 206, first and second hairpins are installed in the stator core. The hairpins may be installed by inserting the legs of the hairpins into the appropriate slots. All of the hairpins may be installed from the same end of the stator core so that all of the crowns are located on one end of the stator, and the ends of the legs are located on the other end. Once installed, the legs of the hairpins are bent away from each other to form twists that extend generally circumferentially. The ends of the twists of the first and second hairpins are circumferentially spaced from each other requiring a jumper to bridge the gap. At step 208, insulation is stripped from the ends of the first and second hairpins so that they may be electrically connected to the jumper. The stripping may occur before or after the hairpins are installed in the stator core.

At step 210, the jumper is installed to the stator core by receiving the first and second ends through the first and second holes of the jumper, respectively, and seating the lower surface of the jumper body on the insulation of the hairpins. The holes of the jumper self-support the jumper in place so that fixturing may not be required during joining. The jumper is secured to the windings by joining the first hairpin to the area surrounding the first hole and joining the second hairpin to the area surrounding the second hole. In one or more embodiments, the jumpers are joined to the hairpins by welding such as laser welding. In other embodiments, the jumpers may be joined by braising or soldering.

The method 200 has many advantages over traditional stamping methods for manufacturing jumpers in that the jumpers of the method 200 may be self-supporting whereas the prior jumpers, due to limitations in stamping technology, were not self-supporting. This reduces the amount of fixturing required to assemble the windings of the electric machine which may increase efficiencies and reduce costs associated with constructing hairpin electric machines.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a stator core;
   interconnected hairpins attached to the stator core and defining a path, a pair of the interconnected hairpins having first and second ends, respectively, circumferentially spaced apart from each other; and
   a jumper interconnected between the first and second ends, the jumper including a body defining an upper surface, a lower surface, and first and second holes extending between the upper and lower surfaces, wherein the first and second holes receive the first and second ends, respectively, wherein the first hole is defined by a perimeter having opposing first and second walls and opposing third and fourth walls, and wherein a thickness of the body, measured between the upper and lower surfaces, is greater than a distance between the opposing first and second walls and is greater than a distance between the opposing third and fourth walls.

2. The electric machine of claim 1, wherein the second hole is defined by a perimeter having opposing first and second walls and opposing third and fourth walls.

3. The electric machine of claim 1, wherein the first and second holes are fully enclosed.

4. The electric machine of claim 1, wherein the perimeter of the first hole further has a fifth wall that engages with a same side of one of the pair of the interconnected hairpins as the fourth wall.

5. The electric machine of claim 1, wherein the holes are substantially rectangular.

6. An electric machine comprising:
   a stator core;
   interconnected hairpins attached to the stator core and defining a path, a pair of the interconnected hairpins having first and second ends, respectively, circumferentially spaced apart from each other; and
   a jumper interconnected between the first and second ends, the jumper including a body defining first and second holes that receive the first and second ends, respectively, wherein the first hole is defined by a perimeter having opposing first and second walls and opposing third and fourth walls, wherein the jumper further includes joining portions in which the holes are located, each of the joining portions having walls each with an inner surface that forms a portion of the perimeter of the first hole and an outer surface forming a portion of an exterior of the body, wherein widths of the walls, measured between the inner and outer surfaces, is between 2 to 3 millimeters, inclusive.

7. The electric machine of claim 6, wherein the second hole is defined by a perimeter having opposing first and second walls and opposing third and fourth walls.

8. The electric machine of claim 6, wherein the first and second holes are fully enclosed.

9. The electric machine of claim 6, wherein the body has opposing upper and lower surfaces, and the first and second holes extend from the upper surface to the lower surface.

10. The electric machine of claim 9, wherein a thickness of the body, measured between the upper and lower surfaces, is greater than a distance between the opposing first and second walls and is greater than a distance between the opposing third and fourth walls.

11. The electric machine of claim 10, wherein the perimeter of the first hole further has a fifth wall that engages with a same side of one of the pair as the fourth wall.

12. An electric machine comprising:
   interconnected hairpins defining a path, a pair of the hairpins having first and second ends, respectively; and
   an extruded jumper interconnected between the first and second ends, the jumper including a body having opposing upper and lower surfaces and first and second holes extending from the upper surface to the lower surface, the first and second holes receiving the first and second ends, respectively, wherein each of the holes have at least four sides to self-support the jumper to the hairpins, and wherein a thickness of the body, measured between the upper and lower surfaces, is greater than a diameter of the first hole.

13. The electric machine of claim 12, wherein the first hole is fully enclosed.

14. The electric machine of claim 12, wherein the first and second ends have a rectangular cross section, and the first and second holes are rectangular.

15. The electric machine of claim 14, wherein the pair of the hairpins have an insulator and metal conductor disposed within the insulator and extending from the insulator so that the ends are bare, and wherein the first and second holes are sized to receive the bare ends and the interconnected hairpins are seated on end surfaces of the insulators.

16. The electric machine of claim 12, wherein the jumper further includes joining portions in which the holes are located, each of the joining portions having walls each with an inner surface that forms a portion of a perimeter of the hole and an outer surface forming a portion of an exterior of the body, wherein widths of the walls, measured between the inner and outer surfaces, is between 2 to 3 millimeters, inclusive.

* * * * *